March 20, 1956 H. W. HART 2,738,766
AUTOMATIC FLEXIBLE CONVEYOR POULTRY FEEDER
Filed July 1, 1952 2 Sheets-Sheet 1
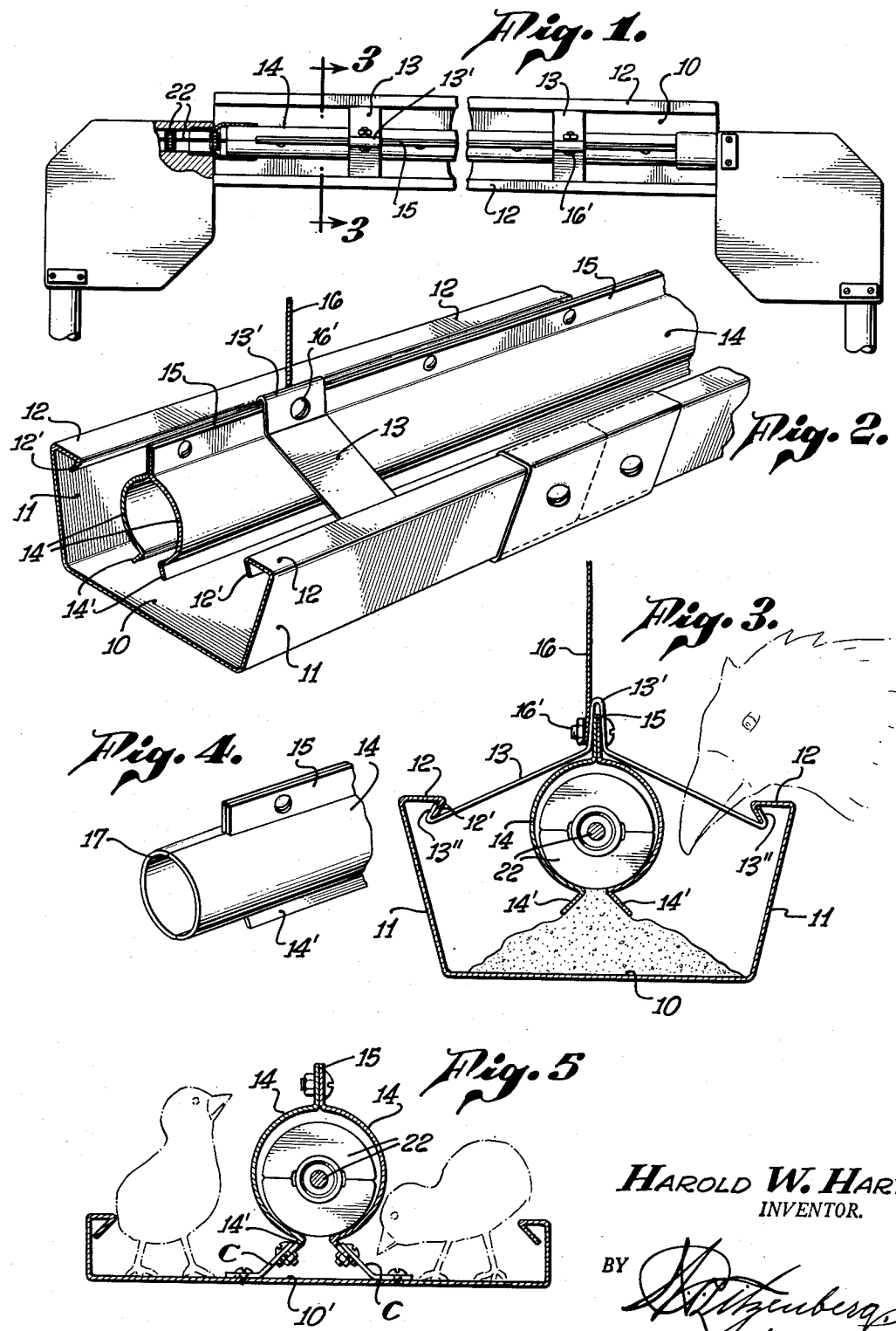
HAROLD W. HART,
INVENTOR.
BY 
ATTORNEY.

March 20, 1956  H. W. HART  2,738,766
AUTOMATIC FLEXIBLE CONVEYOR POULTRY FEEDER
Filed July 1, 1952  2 Sheets-Sheet 2
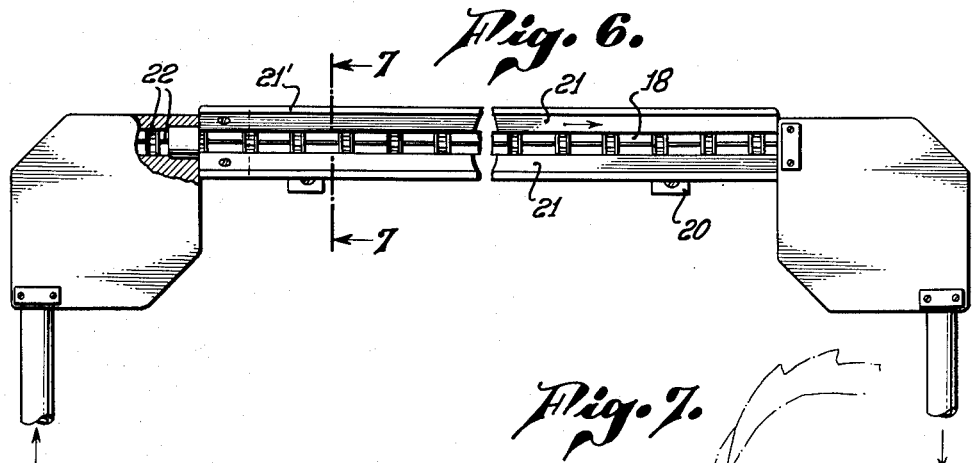
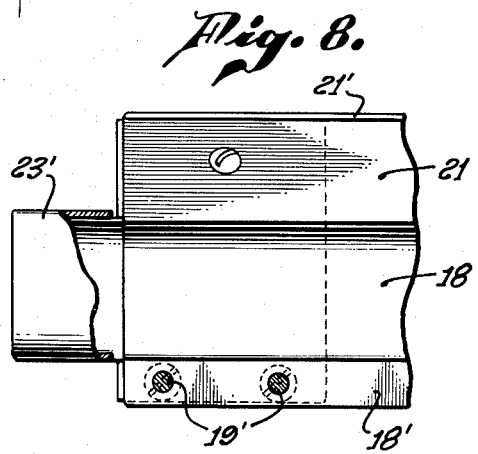
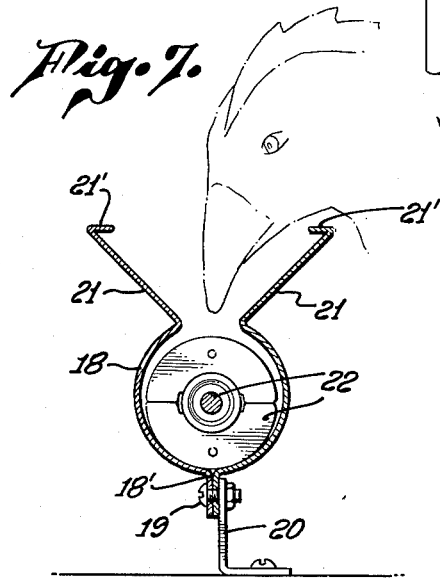
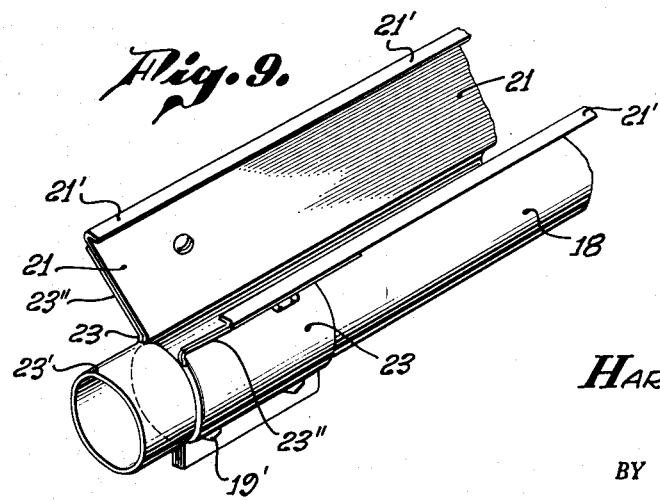
Harold W. Hart,
INVENTOR.
BY 
ATTORNEY.

United States Patent Office 2,738,766
Patented Mar. 20, 1956

2,738,766

AUTOMATIC FLEXIBLE CONVEYOR POULTRY FEEDER

Harold W. Hart, Glendale, Calif.

Application July 1, 1952, Serial No. 296,662

4 Claims. (Cl. 119—52)

This invention relates to automatic flexible conveyor poultry feeders, and more particularly to a feed trough, or feed trough section, which can be used in connection with a line of tubular conveyors for carrying loose feed throughout an extended feeding system, said tubular conveyors having a flexible conveyor moving therethrough to move the feed material therein throughout the system.

Among the salient objects of the invention are:

To provide in connection with a line of tube conveyors, certain tube sections, connected into the line, but which have one side open lengthwise thereof, with the sides of the tube, along opposite sides of said opening, tapering outwardly in opposite directions, and the flexible conveyor therein moving feed material to and along said opening for feeding purposes;

To provide in connection with a tubular conveyor system for loose feed material having a flexible conveyor movable therein, an open tubular section which can be connected into the regular line of tube conveyor and through which said flexible conveyor can move loose feed material, said open tubular section having the sides along its opening bent outwardly and upwardly in opposide directions.

Other objects and advantages of the invention will appear from the following more detailed description thereof, taken with the accompanying two sheets of drawings.

Figure 1 is a plan view, looking down into a feed trough embodying my invention and through which a traveling conveyor moves, two turn blocks being shown for the conveyor;

Figure 2 is an enlarged perspective view of a feed trough embodying my invention, showing a section of conveyor tube therein, designed to discharge feed on to the bottom of said trough;

Figure 3 is an enlarged vertical sectional view, taken on line 3—3 on Fig. 1, showing the design or section of conveyor tube seen in Fig. 2;

Figure 4 is a perspective view of a detail, partly in section, showing a coupling member used to connect the regular or main tube conveyor to a tubular feeding section, to be used in connection with a feed trough;

Figure 5 is a vertical sectional view through a flat feed trough with a tubular feed section supported therein, slightly above the bottom of said trough;

Figure 6 is a plan view, similar to Fig. 1, in which a different design of open trough or feed section is connected into the conveyor system;

Figure 7 is a sectional view through Fig. 6, taken on line 7—7;

Figure 8 is a side elevation of the end of a conveyor and trough section, showing an end insert or coupling member for connecting it to a regular tube conveyor; and Figure 9 is a perspective view showing a feed trough of V-form, to be connected into a tubular conveyor system, and showing a coupling member.

Referring now to Figs. 1 to 5 inclusive, I have shown a feed trough formed of sheet metal, substantially of the form shown in cross section, as seen in Fig. 2, said trough having the flat bottom 10, with inclined sides 11, 11, the upper edges of which are bent inwardly in the angle form, as at 12, 12, providing the top flat portion with the inturned, hook-like lips, as 12'. These upper inturned portions constitute one form of supporting means for suspending said trough in feeding positions. The showing in Figs. 2 and 3 includes flat metal clips, as 13, folded in their middle portions, as at 13', with their free ends extended downwardly and outwardly and provided with hook-like portions, as 13", designed to hook in the inturned portions of the top edges of the trough structure, as shown.

In Figs. 2 and 3, I have shown a section of tubular feed conveyor, corresponding to the main tubular conveyor of my improved system, and through which my flexible conveyor moves. This particular section is formed of two sheets of metal, formed into the tubular body portion 14, with its top formed into two flat ledge-like portions, as 15, secured together, as shown, and over which fits the fold 13' of the supporting clip 13, as clearly indicated in Fig. 3.

As a means of suspending said trough, a suspending cable or strip, as 16, can be secured at its lower end to the bolt 16', which secures the fold 13' of the clip 13 to the ledge-like portion 15, as shown in Fig. 3.

The lower side of said tubular body portion 14, is open and the edges 14' thereof are inclined outwardly, as shown, so that the feed moves or falls therethrough down on to the bottom 10 of the trough, as seen in Fig. 3. There is an advantage in an arrangement which lets the feed fall from the tube conveyor down into the trough, as it tends to prevent the spread of disease, for only a small amount of feed is discharged as the conveyor moves along in the tube and the poultry cannot get into any considerable quantity of feed at one time, and it also makes possible a more successful interval feeding for it avoids the usual rush of chickens to get fresh feed, as is done in present methods used.

In Fig. 4, I have shown a coupling member, designated 17, by means of which my regular tubular conveyors can be connected to separate tubular feed sections, such as shown in Figs. 2 and 3, and in feed troughs, thus making it possible to connect different tubular feed sections into the main system, as desired.

In Fig. 5, I have shown a flat trough 10' with a tubular feed section 14 mounted therein and secured to the floor thereof by short clips or legs C, C, bolted to the outwardly flaring edges 14'.

In Figs. 6 to 9, inclusive, I have shown another form of tubular feed section, capable of being connected into the main line of conveyor tubes. In this feed section, the tubular body portion is designated 18, with its bottom provided with the ledge-like portions 18', bolted together, as at 19, where it is also shown bolted to a supporting bracket 20. The top of said body portion 18 is open, and the sides are extended upwardly and outwardly in V-form, as at 21, 21, with the upper edges 21' thereof bent inwardly in hook-like form to provide a smooth upper edge, and also to prevent feed from being thrown out of the V-form, as will be understood from the showing in Fig. 7. In this form, the feed is in the body portion, and is being moved along by the flexible conveyor, designated 22, in all figures.

These feed sections can be of any length desired, and can be connected into the main tubular conveyor system, as by means of a coupling member, designated 23, having the tubular extension 23', to telescope into another similar tube.

The coupling member 23, with short tubular portions 23', is shown open in its top, and has the upwardly inclined V-wings 23" to underlie the upwardly inclined sides 21 of the conveyor section 18, and is bolted thereto, as indicated at 19'. The short tubular portion 23' telescopes into the regular tube system presented in a companion application being filed simultaneously with this application.

Thus I have invented and provided a feed trough especially adapted to various uses in connection with my automatic feeding system in which loose feed is conveyed through a system of tubes to various feeding stations, bins or floors, and also to various levels, as from one floor to another floor above or below, said troughs being adapted to be connected into the continuous tube system whereby feed can be made available for poultry or other animals at different locations along the line of said system. By the use of such specially designed and adapted feed troughs, in connection with a continuously moving quantity of loose feed, the feed can be made available to the poultry in such quantity as to avoid waste and to avoid spoiling the feed by making it possible for the feeding process without permitting the fowl to get into it with their feet and thus scatter and waste much feed.

I do not limit my invention to the details of construction and arrangement shown for purposes of explanation except as I may be limited by the hereto appended claims forming a part of this application.

I claim:

1. In a poultry feeding system having an endless, tubular conveyor line for loose feed, and a flexible conveyor of circular cross section movable axially therethrough: at least one tubular feeding section for connection in to form part of said tubular conveyor line, said feeding section having its top side open lengthwise thereof, said opening being of less width than the diameter of said flexible conveyor movable therethrough, the opposite sides of the opening along the tubular feeding section diverging outwardly and upwardly in V-form to provide a feeding section and to prevent waste of feed over the sides of the tubular feed section, the ends of the feed section being provided with coupling means for connecting the section into the tubular conveyor line at selected locations.

2. A poultry feeding system as set forth in claim 1 in which said open tubular feeding section is of spring material to adapt it for springing laterally outwardly at opposite sides of the opening in the top thereof so as to widen said opening and thus allow withdrawal of a portion of said flexible conveyor outwardly through said opening.

3. A poultry feeding system, including: an endless, tubular, sectional line of circular cross-sectional shape; an endless, flexible feed conveyor of circular cross-sectional shape movable axially through said tubular conveyor line and adapted to move loose feed through said tubular conveyor, at least one section of said tubular conveyor line having a side open lengthwise thereof and providing a slot of less width than the diameter of said flexible conveyor so that the feed conveyor bridges said slot as it moves through said section, said slotted section having walls at opposite sides of the slot flared outwardly in opposite directions from the slot.

4. A poultry feeding system as defined in claim 3, in which said tubular feeding section has at its opposite ends coupling means whereby the ends of the section can be telescoped into other sections of said tubular conveyor line.

References Cited in the file of this patent

UNITED STATES PATENTS

| 1,466,864 | Walker et al. | Sept. 4, 1923 |
| 1,811,064 | Raney et al. | June 23, 1931 |
| 2,563,321 | Dugan | Aug. 7, 1951 |
| 2,630,906 | Philipp | Mar. 10, 1953 |
| 2,646,023 | Virgil | July 21, 1953 |

OTHER REFERENCES

The Buckeye E-Z Automatic Poultry Feeder, Aug. 1950, published by the Buckeye Incubator Co., Inc., of Springfield, Ohio.

Big Dutchman Automatic Poultry Feeder, Jan. 17, 1951, published by the Automatic Poultry Feeder Co., of Zeeland, Michigan.